United States Patent [19]
Zeiders, Jr.

[11] 3,942,880
[45] Mar. 9, 1976

[54] LASER MIRROR
[75] Inventor: Glenn W. Zeiders, Jr., Watertown, Mass.
[73] Assignee: Avco Corporation, Cincinnati, Ohio
[22] Filed: Sept. 27, 1968
[21] Appl. No.: 763,422

[52] U.S. Cl. ............ 350/310; 350/288; 331/94.5 D
[51] Int. Cl.² ........................ G02B 5/08; H01S 3/05
[58] Field of Search ............ 350/288, 310; 331/94.5

[56] References Cited
UNITED STATES PATENTS
3,325,266  6/1967  Stong .................................. 350/288

OTHER PUBLICATIONS
Mobsby: "Gleanings for ATM's, Experiments with Cemented Mirrors", Sky & Telescope, Vol. 28, No. 5, Nov. 1964, pp. 305, 306, 308–311.

Primary Examiner—T. H. Tubbesing
Assistant Examiner—N. Moskowitz
Attorney, Agent, or Firm—Charles M. Hogan; Melvin E. Frederick

[57] ABSTRACT

A laser mirror resistant to thermal distortions produced by radiative heating and/or heating by other processes associated with high power CW lasers. A plurality of rods connect a flexible face portion to a stiff base portion to define an "elastic" arrangement which permits free lateral expansion but resists if not prevents distortion in the form of bending of the face portion. The face portion may be formed
1. from a block of heat conductive material which has been deeply slotted from its rear end to define an effectively thin face portion attached to a middle portion of high heat capacity, or
2. from a thin plate of heat conductive material cooled from the rear face by either forced convection to, or by nucleate boiling of, a flowing heat transfer media in the middle portion.

8 Claims, 5 Drawing Figures

GLENN W. ZEIDERS JR.
INVENTOR.

BY Charles M. Hogan
Melvin E. Frederick

GLENN W. ZEIDERS JR
INVENTOR.

BY Charles M. Hogan
Melvin E. Frederick

GLENN W. ZEIDERS JR.
INVENTOR.

LASER MIRROR

This invention relates to laser mirrors and more particularly to laser mirrors subject to thermal distortion and arranged and adapted to resist thermal distortion detrimental to laser action.

Optical masers or lasers, as the art has developed, generally involve the establishment of an artificial distribution of bound electrons at energy levels other than the natural distribution in a host environment through the application of a source of energy known as the "pumping energy." This results in a greater number of molecules or atoms in some high energy level than in a lower energy level to which it is optically connected. This is known as a population inversion. The electrons present in the host environment in the artificial distribution then give up their energy and undergo a transition to the lower energy level. The released energy may be in the form of electromagnetic radiation; which, in the majority of devices seen thus far in the art, has been light, either in the visible or infrared.

In laser devices currently available in the art, there may be employed a gas, such as a helium-neon mixture; or a crystal, such as chromium doped aluminum oxide; or a noncrystalline solid, such as neodymium glass; or a liquid, such as trivalent neodymium in selenium oxychloride, as the environment which responds to the pumping energy, permitting the population inversion of electrons between an excited state and a lower state. The electrons in returning to the lower state give off quanta of light energy or photons in what is known in the art as a radiative transition. When the density of these photons becomes large, the radiative transition probability increases; and, in the presence of a population inversion, electromagnetic modes into which the photons are emitted, in turn, become most readily able to induce further emission therein. This is known in the art as stimulated emission of radiation and results in a narrowing of the emission line. In the currently available laser devices, electrical power is converted to pumping light, or electrical discharge or electric current, which, in turn, is used to establish the population inversion. All known prior art lasers are of relatively low power. A high power laser has been a long sought need for a large number of potential applications, both military and commercial, and numerous attempts have been made to provide a truly high power laser. The gas laser is the general category into which most of these efforts have fitted.

In the Polanyi references identified hereinafter, it is suggested that total and partial inversions may be obtained as a direct result of chemical reaction. Without flow, such inversions are transient. Even if the gas is pulsed thermally and permitted to relax differentially, such disclosed devices are inherently low density devices since the translational and rotational energy is removed by diffusion to the walls. The Hurle et al paper also identified hereinafter suggests a gas dynamic laser utilizing supersonic expansion as a method of producing population inversion between electronic states by differential radiation relaxation. However, Hurle et al admit that they were unable to observe an inversion and in any event, the size of a gas dynamic laser based solely on this principle is limited because of radiative trapping and also the stagnation temperatures required to have a significant fraction of the energy in the desired electronic level at equilibrium are quite high. For the purpose of convenience, a laser, the principle of operation of which is based on supersonic expansion as a method of producing population inversion, is referred to as a gas dynamic laser.

The following references and materials cited therein describe some of the background and physical principles involved in the gas dynamic laser under discussion and an insight, to some degree, of application of those principles in the present state of the art:

1. "Infrared and Optical Masers," by A. L. Shawlow and C. H. Townes in Physical Review, Vol. 112, No. 6, Dec. 15, 1958, pp 1940–1949.
2. "Attainment of Negative Temperatures by Heating and Cooling of a System" by N. G. Basov and A. N. Oraevskii, Soviet Physics, JETP, Vol. 17, No. 5, Nov. 1963, pp 1171–1172.
3. "Population Inversion in Adiabatic Expansion of a Gas Mixture" by V. K. Konyukhov and A. M. Prokhorov, JETP Letters, Vol. 3 No. 11, June 1, 1966, pp 286–288.
4. "Electronic Population Inversions by Fluid-Mechanical Techniques" by I. R. Hurle and A. Hertzberg, The Physics of Fluids, Vol. 8, No. 9, Sept. 1965, pp 1601–1607.
5. Polanyi, J. C., J. Chem. Phys. 34 347 (1961).
6. Polanyi, J. S., Applied Optics Supplement No. 2 on Chemical Lasers, 109 (1965).

Broadly, operative gas dynamic lasers of the type here concerned comprise a gas containing chamber having an exhaust outlet; means for heating a polyatomic gas to provide equilibrium vibrational excitation in said gas, the polyatomic gas having an upper laser level, lower laser level and a ground state, the upper laser level having an effective relaxation time that is long compared to the effective relaxation time of the lower laser level; nozzle means for expanding the heated gas into the chamber into a stream to provide a flow time in the nozzle means that is short compared to the effective relaxation time of said upper laser level and long compared to the effective relaxation time of said lower laser level; and an optical resonator coupled to said stream of gas. For a more thorough and detailed discussion of operative gas dynamic lasers, reference is made to patent application Ser. No. 626,357, filed Feb. 16, 1967, entitled "High Powered Laser" and assigned to the same Assignee as this application.

In the field of lasers, it has long been known that the alignment and optical figure of the mirrors are of critical importance in order to maintain maximum output. Frequently, laser mirrors after being correctly aligned and particularly mirrors used in chemical reaction and gas dynamic lasers wherein they are exposed to hot gases as described above are subjected to radiative and aerodynamic heating which cause misalignment and distortion and to the present, no suitable system has been devised for maintaining mirror alignment and optical figure during operation of such lasers.

If one surface of a disc is exposed to a uniform heat flux $q$, conduction produces a temperature gradient in the material normal to the surface. In the absence of external restraint, the differential thermal expansion results in spherical bending to a radius of curvature $$R = m\ k/a\ q$$

where $m = 1$ for uniform gradient ($q$ removed through rear face)

= 2 for heat sink (no heat removed through rear face)
$k$ is thermal conductivity
$a$ is thermal expansion coefficient.
The peak distortion is then $$\delta_o = \frac{a^2}{2R} = \frac{\alpha q}{mk} \frac{a^2}{2} = \frac{\alpha}{2m \pi k} Q$$

where
$a$ is the radius of the disc
$Q = \pi a^2 q$ is the total flux to the surface.

In a high quality optical system, the surface distortion of an optical element must be a small fraction of the wavelength of the radiation, about 10% at most. In a $CO_2$ laser system, for example, distortions cannot be permitted to exceed 1 micron. With an unrestrained heat-sink copper mirror having 99% reflectance, the maximum allowable beam power is then 1.5 KW. Gas dynamic $CO_2$ lasers are virtually unlimited in output power if the mirror distortion problem can be solved. Indeed, power levels close to 1 MW have already been demonstrated but with questionable beam quality.

Accordingly, it is an object of the present invention to provide an improved laser.

It is another object of the present invention to provide an improved laser mirror.

It is another object of the invention to provide a laser mirror that is resistant to misalignment resulting from thermal bending.

A further object of the invention is to provide a laser mirror subjected to thermal stress during use that at least substantially maintains proper alignment throughout operation of the laser.

A still further object of the invention is to provide a laser mirror unresistive to lateral expansion but resistive to distortion to the direction normal to the operative face of the mirror.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
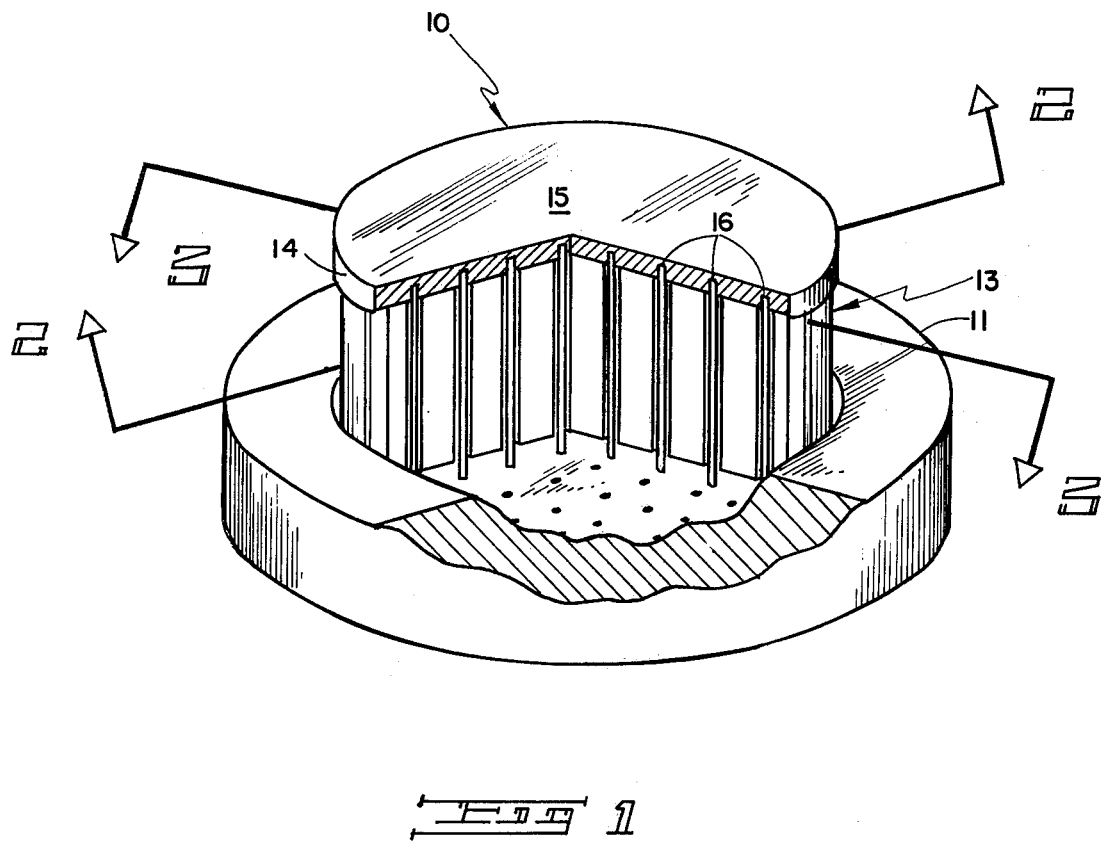
FIG. 1 is a perspective view with a portion broken away of a laser mirror in accordance with the invention.
Figure 3:
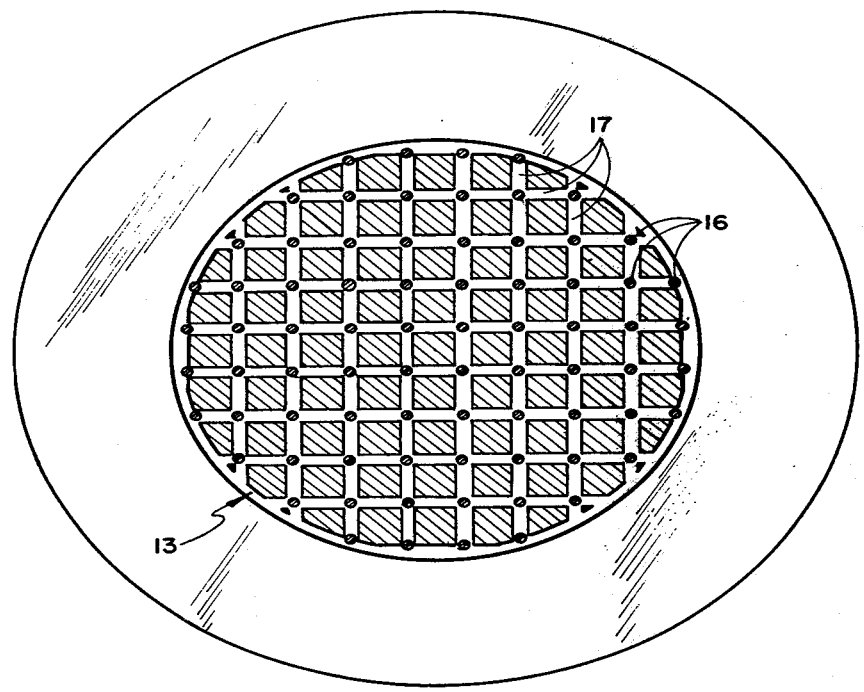
FIG. 3 is a sectional top view taken on line 3—3 of FIG. 1.
Figure 2:
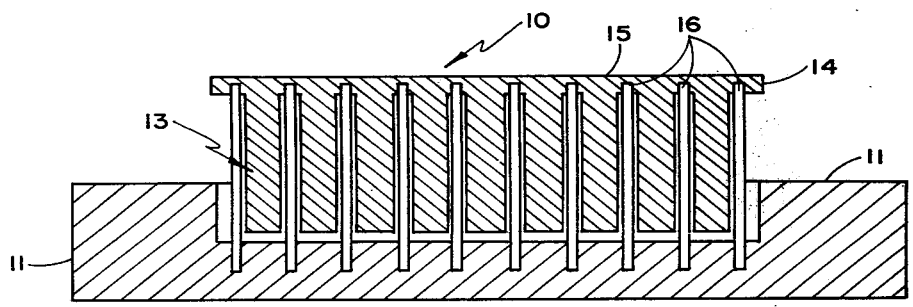
FIG. 2 is a sectional side view taken on line 2—2 of FIG. 1.

Referring now to FIGS. 1, 2, and 3 which illustrate a mirror 10 in accordance with the present invention, there is shown a relatively thick metal base portion 11 and a metal block member 12 deeply slotted from its rear (adjoining the base portion 11) to define a heat storage middle portion 13 and an effectively thin face portion 14 having an exposed surface 15 which when suitably processed forms the mirror surface. The base portion 11 is preferably composed of as stiff a material as possible, such as, for example, stainless steel, while the metal block member 13 may be composed of, for example, OHFC copper, a material less stiff than stainless steel, but a very good heat conductor and mirror material. The metal block member 12 is fixedly attached in spaced relationship to the base member 11 by a plurality of slender rods 16 formed preferably from Invar because of the high strength, low thermal expansion, and low thermal conductivity of that material. The rods 16 are disposed in the slots 17 in uniform spaced relationship and are fixedly attached as by brazing and the like to the base portion 11 and through the rear of the face portion 14 to a point as close as is practical to the exposed surface 15. The slots 17 must be of sufficient width to permit lateral movement of the rods 16 as more fully explained hereinbelow.

When surface 15 is exposed to hot gases, laser radiation, and the like during use, the rods 16 can bend easily and thereby permit substantially free lateral thermal expansion of the face portion 14 without accompanying bending moments and shear. In combination with the base portion 11, the rods 16 substantially prevent bending of the face portion 14 in the direction normal to the surface 15. The slotted middle portion 13 acts as a heat sink without stressing the face portion 14. Provision for flow of a heat transfer fluid such as water through the middle portion 13 is advisable for operations closely spaced in time where natural convection or thermal radiation is inadequate for removal of the stored heat.

Figure 4:
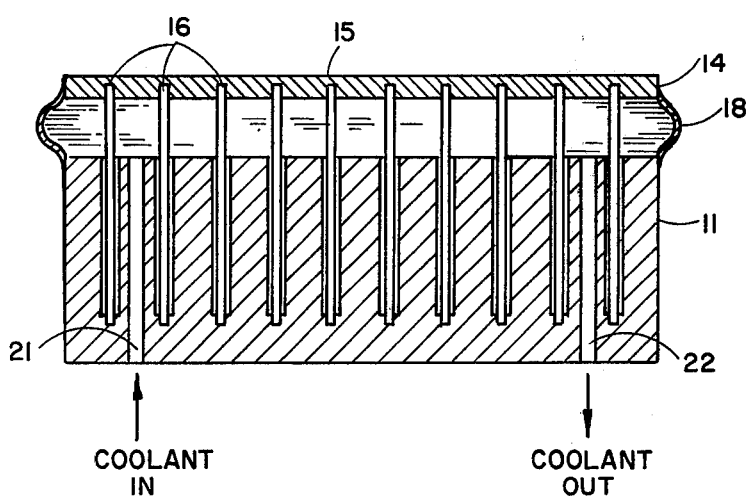
FIG. 4 is a sectional side view of an alternate embodiment for extended duration applications.

For extended duration applications where sufficient thermal capacity is not available from the middle portion 13, the middle portion need not be embodied in the design. Instead, as shown by way of example in FIG. 4, a cylindrical bellows 18 may be fixedly attached to the face portion 14 and the base portion 11 to prevent loss of a heat transfer fluid such as water injected into and withdrawn from the space between the face portion and rear portion through respectively ports 21 and 22 in the base portion 11. This will withdraw heat from the mirror by forced convection and/or nucleate boiling through intimate contact with the rear of the face portion 14.

In an actual embodiment of the invention, the base portion 11 was formed from stainless steel, about 1 inch thick, 5½ inches in diameter and countersunk to provide a recess at its central portion about ½ inch deep and 3½ inches in diameter. The face portion and middle portion was fabricated from OHFC copper to provide a face portion 14 about ⅛ inch thick and 3½ inches in diameter and a slotted middle portion 16 about 1¼ inches thick and 3⅜ inches in diameter. Seventy-six Invar rods about 1/16 inch in diameter and 1½ inches long were disposed in the slots which were equally spaced about ⅜ inch apart as best shown in FIGS. 2 and 3. The extreme ends of the Invar rods were countersunk into and brazed to the face portion 14 and base portion 11. Suitable mounting means (not shown) engage the base member 11 to permit the mirror to be adjustably mounted in the laser cavity.

It will now be seen that in accordance with the invention, thermal bending of the mirror is reduced if not prevented by effectively making the mirror as thin as possible and supporting it from the rear by rods and a base having a stiffness much greater than that of the mirror, the rods and base in combination being flexible only to lateral expansion of the mirror in the radial direction. This lack of resistance to expansion in the radial direction and resistance to expansion in the axial direction may be achieved by utilizing a very stiff base in combination with a large number of uniformly spaced wires or rods which fixedly connect the mirror of the base.

The significant design parameter governing the effectiveness of the aforementioned "elastic" support structure is the stiffness factor $\beta$ given by $$\beta = a \left[ \frac{E_R}{4 D_M L} \frac{A_R}{A_M} \left( 1 + \frac{D_M}{D_B} \right) \right]^{1/4}, D = \frac{E t^3}{12(1-v^2)}.$$

where
- $a = \sqrt{A_M/\pi}$ is the radius of the face portion 14
- $L$ is the length of the rods 16
- $E$ is the modulus of elasticity
- $t$ is thickness
- $v$ is Poisson's ratio
- $A_R$ is the total cross sectional area occupied by the rods and the subscripts R, M, B refer respectively to the rods 16, the mirror face portion 14, and the base portion 11.

A weak "elastic" support structure ($\beta \ll 1$) with uniform heating results in the spherical distortion $\delta_o$ given previously. For a stiff support structure with $\beta > 1$, the total distortion of the mirror face is the sum of two terms:

1. a spherical distortion $\omega_1$ arising from curvature of the base portion 11, given by the equation $$\omega_1 \cong -\delta_o \frac{D_M}{D_B} \left[ 1 + \frac{3+v}{2(1+v)} \frac{d^2}{\delta_o L} \beta^4 \alpha \overline{T} \right] \left( \frac{r}{a} \right)^2, v \cong \frac{v_B + v_M}{2}$$

where
- $d$ is the diameter of a rod 16
- $\overline{T}$ is the temperature rise of the face portion 14 and 2. an oscillatory distortion of the face portion 14 relative to the base portion 11 arising from stress relief at the mirror edge, given by the equation $$\omega_2 \cong \frac{\delta_0}{\beta^2} \sqrt{1+\Gamma^2}\,(1+v_M)\, e^{-\beta\left(1-\frac{r}{a}\right)} \sin\left[\beta\left(1-\frac{r}{a}\right) - \tan^{-1}\Gamma\right].$$

where $$\Gamma \cong 1 + \frac{3}{4} \frac{d^2}{\delta_o L} \frac{\alpha \overline{T}}{1+v_M} \beta^3$$

Figure 5:
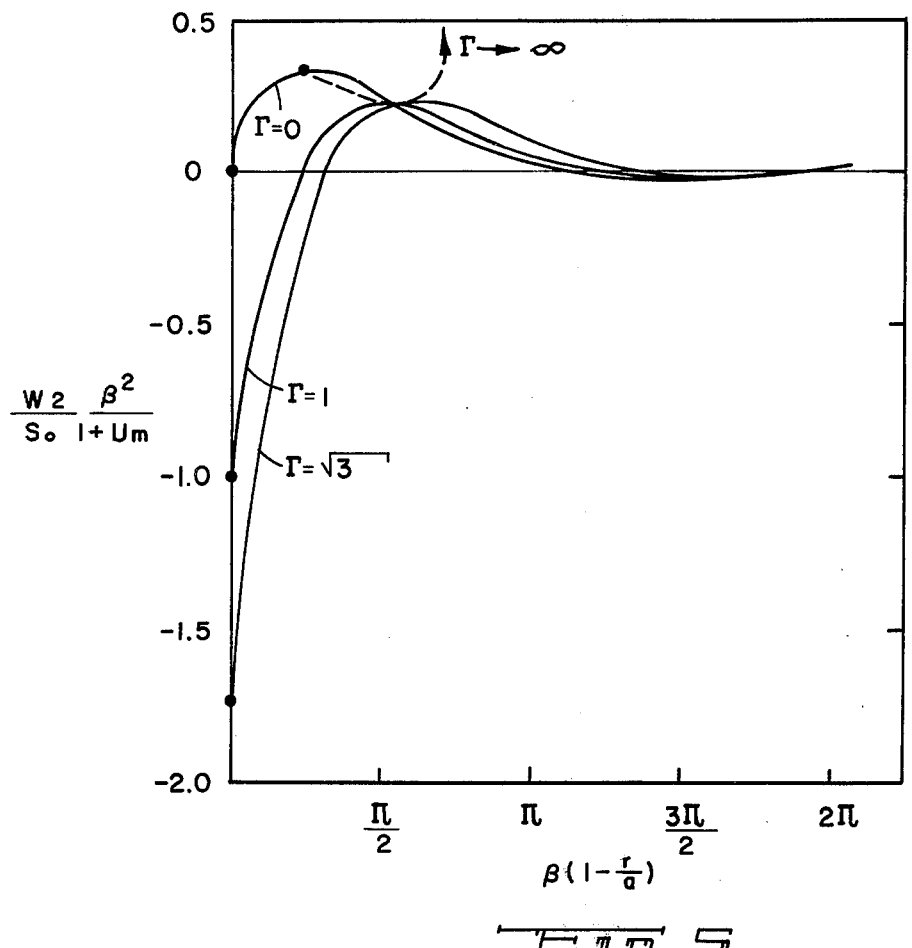
FIG. 5 is a graphic representation of radial variation of the deflection of a circular mirror in accordance with the invention, where the base-to-mirror stiffness parameter $\beta$ is considerably greater than one, and for which the base portion does not bend.

The distortion $\omega_2$ is shown in FIG. 5. For short duration operation with the heat sink design or for operation with the cooled design, the parameter $\Gamma$ is very close to unity and the maximum value of the $\omega_2$ distortion decreases as $\beta^{-2}$, the distortion appearing only within a region of width about $\pi/(\beta a)$ at the mirror edge. The $\omega_2$ edge distortion is unimportant if only the region out to $r \cong a(1 - \pi/\beta)$ is used for the mirror surface 15. The primary distortion is then $\omega_1$ which may be made as small as required by increasing $D_B/D_M$.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. In a mirror for use in a laser, the combination comprising:
   a. a face portion having an exposed optically reflective surface;
   b. a rear portion spaced from said face portion, said rear portion being substantially inflexible as compared to said face portion;
   c. rod means having a low coefficient of expansion fixedly connected to said face portion and rear portion for maintaining them in substantially fixed spaced relationship; and
   d. means for removing heat from said face portion including means for passing a coolant through said space between said face portion and said rear portion.

2. The combination as defined in claim 1 wherein said face portion is metal and has a thickness dimension small compared to any of its other dimensions.

3. The combination as defined in claim 2 wherein said rear portion is metal and has a thickness dimension and stiffness substantially greater than that of said face portion.

4. The combination as defined in claim 3 wherein said rod means comprise a plurality of metal rods having a radius small compared to their length and are substantially equally spaced one from another.

5. The combination as defined in claim 4 wherein said heat conductive means comprises elongated metal members interposed between said rods.

6. In a mirror for use in a laser, the combination comprising:
   a. a thick metal block member having an exposed optically reflective surface and a rear surface, said block member having a plurality of slots extending from said rear surface toward said reflective surface to define an effectively thin face portion which includes said reflective surface;
   b. a metal rear member coextensive and spaced from said rear surface, said rear member having a stiffness substantially greater than that of said thin face portion; and
   c. a plurality of thin metal rods fixedly connected at their ends to said face portion and said rear member, said rods extending through said slots in spaced relationship to the sides thereof.

7. The combination as defined in claim 6 wherein said metal block is copper, said rods have a low coefficient of expansion, a radius small compared to their length, and are substantially equally spaced one from another.

8. The combination as defined in claim 7 wherein said rear member has a thickness greater than that of said face portion and a flexibility of the order of that of stainless steel.

\* \* \* \* \*